(12) United States Patent
Pfeiffer et al.

(10) Patent No.: US 6,869,267 B2
(45) Date of Patent: Mar. 22, 2005

(54) ROBOTIC STACKER

(75) Inventors: Bernd Pfeiffer, Landsberg (DE); Hans-Peter Beins, Bad Heilbrunn (DE); Bernhard Berkmüller, Neuried (DE)

(73) Assignee: Siempelkamp Handling Systeme GmbH & Co., Wolfratshausen (DE)

( * ) Notice: Subject to any disclaimer, the term of this patent is extended or adjusted under 35 U.S.C. 154(b) by 23 days.

(21) Appl. No.: 10/107,686

(22) Filed: Mar. 26, 2002

(65) Prior Publication Data

US 2003/0147737 A1 Aug. 7, 2003

(30) Foreign Application Priority Data

Feb. 4, 2002 (EP) ............................................ 02002546

(51) Int. Cl.⁷ ................................................. B65G 57/02
(52) U.S. Cl. ................................ 414/792.7; 414/791.6; 414/902
(58) Field of Search ........................... 414/792.7, 790.9, 414/791.1, 791.6, 792.9, 902

(56) References Cited

U.S. PATENT DOCUMENTS 3,656,634 A * 4/1972 Pearne et al. ......... 414/792.7 X
5,844,807 A * 12/1998 Anderson et al. ....... 414/902 X

FOREIGN PATENT DOCUMENTS

| DE | 32 10 490 A1 | 9/1982 |
| DE | 35 41 743 A1 | 5/1987 |
| EP | 0 146 643 A1 | 7/1985 |
| EP | 1 155 984 A1 | 11/2001 |
| EP | 1 208 933 A1 | 5/2002 |
| JP | 58130823 | 8/1983 |

* cited by examiner

*Primary Examiner*—Donald W. Underwood
(74) *Attorney, Agent, or Firm*—Wood Phillips Katz Clark & Mortimer

(57) ABSTRACT

The invention relates to a new device for and a new method of assembling stacking patterns and simultaneously stacking these stacking patterns by means of a robotic manipulator having at least one translational robotic axis.

3 Claims, 3 Drawing Sheets

ROBOTIC STACKER

BACKGROUND OF THE INVENTION

The present invention relates to a method and a device for stacking cut-to-size pieces that are cut from boards.

PRIOR ART

In this context the term "board" is to be understood very generally, it relating to all panel or board materials involving cut-to-size of relatively large master boards as fabricated, into smaller sized pieces for further processing. More particularly, the invention relates to laminated and raw chipboard, OSB, MDF and other fiberboard, gypsum, mineral boards as well as quite generally boards of wood, plastics, metal and composite materials thereof.

For this purpose so called cut-to-size saws are used for cutting large boards of single boards or books into small single pieces or books of pieces by means of shears, saws and the like. The cut-to-size order is determined by one or more so called cutting patterns combined in one commission, mostly calculated with a computer scheduling system for optimum material utilization of the available large board. In other words, it is intended to ensure minimum waste in keeping to the required cut-to-size pieces. This involves arranging the individual sized pieces in the various cutting patterns to minimize waste. Apart from this, computer scheduling the cutting patterns ensures that at any one time of the production only a defined number of different sizes are being worked (so-called open items).

On the other hand, the cut-to-size pieces need to be stacked prior to shipment. This often involves several cut-to-size pieces being located juxtaposed in a stacking layer. This is termed stacking pattern. The stacking pattern within a stack is constant, it in any case being formed of cut-to-size pieces which are either of the same type or at least belong together for certain reasons.

Thus, in all, the arrangement of the cut-to-size pieces in the stacking patterns may totally differ from the arrangement of the same cut pieces in the cutting pattern. Accordingly, after the master board has been cut, the cut pieces are separated as necessary and then assembled into stacking patterns. The stacks made up of the stacking patterns, once completed, are then discharged for further processing elsewhere.

A system having a device for assembling stacking patterns and having stacking bins for stacking the stacking patterns is known, for example, from DE 199 09 001 of the present assignee. There is, however, a wealth of other documents likewise describing various types of such assembly and stacking devices.

SUMMARY OF THE INVENTION

The present invention is based on the technical problem of defining an improved device and improved method for stacking cut-to-size pieces.

In accordance with the invention this problem is solved by a method for stacking cut-to-size board pieces at a stacking bin into a stack comprising the steps: picking said cut pieces with a robotic manipulator, feeding said cut pieces to said stacking bin by said robotic manipulator, placing said cut pieces on said stacking bin by the robotic manipulator in such a way that in placing the cut pieces a stacking pattern of said stack is assembled, said robotic manipulator being traveled along a translational axis.

The invention relates to a device for stacking cut pieces at a stacking bin into a stack, including a stacking bin and a robotic manipulator comprising a translational axis and is designed to pick said cut pieces, feed them to the stacking bin and to place them on said stacking bin in such a way that in placing said cut pieces a stacking pattern of said stack is assembled.

Preferred embodiments are set forth in the sub-claims and read from the following description. It is understood that the disclosure as a whole including the example embodiments fundamentally apply to both the category of the method and the category of the device.

The gist of the invention is to unitize the procedure of assembling stacking patterns and stacking the stacking patterns into a stack and to define a device which implements both procedures unitized. For this purpose a robotic manipulator is provided for picking the cut-to-size pieces at a picking station for presenting them to a stacking bin. In this case it is firstly to be made clear although here and in the following reference is simply made to cut-to-size pieces, it is understood that this may involve both single cut pieces and groups thereof. In this arrangement two or more single cut-to-size pieces may be located juxtaposed in the layers of the stacking patterns (i.e. in the horizontal) still to make up a complete stacking pattern but which, for example, were already located juxtaposed in this way in the cutting pattern and thus were not separated. In addition, it is usual to cut the large master boards, materializing in production, bookwise so that the cut piece may appear in (vertically) stacked books. These books must not be confused in term with the stacks to be produced at the stacking bin. The height of the books is limited to a few layers and is considerably less than that of the final stack. Thus, the term cut-to-size pieces in the present may infer a plurality of cut sizes vertically and/or horizontally. Further, the term "stacking bin" used herein is intended to comprise any device adapted to assemble stacks of the cut-to-size pieces thereon. The term "stacking bin" is regarded to be a common term for such devices without being meant to narrow the scope of the invention in any way.

Once the robotic manipulator has fed the cut-to-size pieces to the stacking bin, it deposits them on the stacking bin, i.e. on other cut-to-size pieces as may already be stacked there. The important thing to be understood in this respect is that the procedure of placing the cut-to-size pieces on the stacking bin increases, for one thing, the height of the stack, i.e. in the sense of "stacking" whilst on the other commencing or supplementing or completing a stacking pattern, i.e. in the sense of "assembling the stacking pattern". The robotic manipulator in accordance with the invention thus combines both aspects, contrary to prior art in which these aspects are handled separately.

A further aspect of the invention consists of the robotic manipulator comprising at least one translational axis, this preferably being the so-called first axis, i.e. the robotic axis slaving the movement in all further robotic axes. The robotic manipulator, i.e. a part thereof, can thus be traveled translationally along a path. The translational axis offers a variety of substantial advantages. For one thing, it is fundamentally highly flexible in its length and is thus able to cover, where necessary, a very wide motional range. For another, robotic designs suitable for translational travel, more particularly so-called gantry or portal robots, are very much easier to equip for handling high loads in the framework of translational degrees of freedom. More particularly, there is no fundamental contradiction between high loading capacity and a wide range covered with translational axes. This is contrary to a rotational axis capable of covering an angular range of max. 360° which can then only be extended to a larger travel range by increasing the maximum radius capable of being sensed. It is, however, the size of the radius that considerably restricts the loading capacity of the robotic manipulator. Despite this, rotational axis robotic manipulators, especially so-called articulated robots, find very wide application due to their compact design and flexibility. In addition to this it is due to this design and because of their wide application that they are comparatively low-priced.

The inventors have, however, recognized that it is especially in handling cut-to-size pieces and groups thereof with at least one translational axis that relatively high manipulating speeds are achievable for quite considerable loads which more than justify the unavoidable, additional costs involved. In combination with the invention aspect of unitizing the assembly of the stacking pattern and stacking, a completely novel and high performance concept materializes in stacking cut-to-size pieces.

Preferably the robotic manipulator thus comprises one or two further translational axes. Where this likewise preferably involves the first axes in each case of the robotic manipulator (i.e. the first and the second or the first to the third axis) this is often called a gantry robot or portal robot.

The robotic manipulator in accordance with the invention does not, of course, exclude rotational axes. As evident from the example embodiment at least one rotational axis implemented in this case together with the third translational axis is preferred to permit rotating the tool of the robotic manipulator in the horizontal. This enables in assembling the stacking pattern the cut sizes to also be rotated (as a rule through 90°) when called for by the stacking pattern. Thus, the rotation device likewise implemented separately conventionally may also be integrated in the robotic manipulator. A further rotational axis may also be connected to the pick-and-deposit function of a manipulator tool as likewise illustrated by the example embodiment.

Furthermore, a transport conveyor, for example a roller or belt transport conveyor, may be provided for transporting the cut-to-size pieces to one or more picking stations. This transport conveyor may, for one thing, transport the cut-to-size pieces from a board cutting device, for instance a saw, involved in cutting the large master boards into cut-to-size pieces. In this arrangement, means for separating the cut-to-size pieces may be provided preferably along a direction of the transport conveyor coming from the saw, termed X-direction in the following. For example, this may be the case at the transition of a transport conveyor arranged at the saw to the transport conveyor described in this case. These two transport conveyors may be powered separately from each other so that they position the corresponding cutting lines at their border as the reference line before then transporting the cut-to-size pieces already located downstream from the reference line away from the reference line. These separating procedures are well known as such and thus do not need to be explained in the present context.

Leading then from the X extent of the transport conveyor is preferably at least one angular transfer station permitting a redirection in transport into an Y-direction perpendicular to the X-direction for branching off from the transport conveyor and a picking station. The angular transfer station is likewise known as such and may be configured in various ways. For example, it may involve a structure with chains or belts for lowering between the rollers of the transport conveyor in the X-direction. These chains or belts can be lifted and lowered between the rollers for transporting cut-to-size pieces away in the Y-direction. In this arrangement the chains or belts may comprise cams or other protuberances provided over only part of the length of the belts so that in raising the belt structure it is only the cut-to-size pieces located there that are lifted and transported away in the Y-direction, as is desired and where correspondingly the cams being located at the correct position. At other locations the cams may be run out of the way so that the lifted chains or belts do not protrude beyond the rollers, resulting in the cut-to-size pieces located there being left in place. There are, however, many other conceivable designs for such an angular transfer station.

The picking station attained after the Y diversion is served by the robotic manipulator and is accordingly assigned to at least one stacking bin. Preferably in the course of the Y movement of the cut-to-size pieces likewise a separator is provided, for example at the transition of a first Y transport conveyor section coming from the angular transfer station to a second Y transport conveyor section directly belonging to the picking station.

At the same time, or as an alternative, the transport conveyor may also serve supplying a train of picking stations in the X-direction and thus indirectly also supplying each of the assigned stacking bins with cut-to-size pieces. In principle, each of these various picking stations and stacking bins may comprise its own robotic manipulator. In this arrangement the translational axis of the robotic manipulator in accordance with the invention may also be oriented in the Y-direction and serve movement of the cut-to-size pieces from the picking station to the stacking bin. Preferably, however, the translational axis of the robotic manipulator is located in the X-direction in serving to permit traveling the robotic manipulator to at least two of the picking stations and stacking bins.

This now makes it possible, for one thing, to supply two stacking bins by a single robotic manipulator. This is, for example, an attractive solution when, as regards various types of cut-to-size pieces and/or various stacking patterns, two or more stacking bins are desired without the total throughput of the system necessitating or justifying the use of a plurality of robotic manipulators.

On the other hand, two or more robotic manipulators may now be used in a certain flexible assignment to the various picking stations and stacking bins in thus permitting added system flexibility especially when the number of robotic manipulators is smaller than the number of picking stations and stacking bins.

In conclusion this may involve a modular concept viewed as being particularly preferably by the invention. In this arrangement a number of stacking bins can be covered by a translational axis of the robotic manipulator. This translational axis can then be provided in various variants or stages of sophistication of the system with one, two or more robotic manipulators. In this way a system initially designed only for various types of cut-to-size pieces and stacking patterns can now be later sophisticated for a higher throughput in stacking. For this purpose the concept of robotic translational axes in accordance with the invention provides a very high degree of freedom, because the translational axes can be dimensioned practically to any extent and also elongated in now permitting operation of a train of different robotic manipulators along a common translational axis.

It is to be noted that the number of picking stations must likewise not necessarily correspond to the number of stacking bins, although this is usually the case.

In all, it is additionally preferred that when a first axis is located along the X-direction the second axis of the robotic manipulator is located in the Y-direction in permitting movement between the robotic stacker(s) and the stacking bin(s). Furthermore, a preferred third translational axis is preferably oriented perpendicular, i.e. in a direction then to be termed the Z-direction. This third Z-axis can then be put to use in picking the cut-to-size pieces from the picking stations, i.e. in lifting them in the vertical direction and correspondingly also in placing them in the vertical direction on the stacking bin. It is, of course, not necessary that the movements along the three axes are made separately, they instead occurring simultaneously and mixed, this applying, of course, likewise to the aforementioned rotational axes.

In stacking it is further preferred, but not necessary, that the stacks materialize the same layer-wise as the cut-to-size pieces at the picking stations. In other words, the stacking patterns should preferably each materialize in a layer thickness corresponding to the book thickness when cutting the original master board size, i.e. a new stacking pattern only being commenced when the previous layer is concluded. It is however just as conceivable to depart from this procedure when specific reasons call for this, more particularly when the stacking pattern is required to contain various cut-to-size pieces and these are supplied "unmatched" at the time.

A further preferred aspect of the invention relates to an additionally provided stacking bin at which stacking patterns consisting of a single sized format (in the horizontal sense) are to be stacked, i.e. one cut-to-size piece on the other or a book thereof on the other. This is generally the case for relatively large cut-to-size pieces. In this case a fully conventionally stacking technique with a fork type stacker can be employed which otherwise is considered prior art in itself. Depending on the cutting pattern this further stacking bin can be put to use as an alternative or parallel to the robotic manipulators in accordance with the invention.

In view of using a train of stacking bins provided in parallel and also in supplementing a stacking bin for stacking patterns of one cut-to-size piece only as just described, that as explained above shows that the concept in accordance with the invention of a translational robotic manipulator axis offers near unlimited flexibility fundamentally. In the case of arranging stacking bins about a first rotational axis as initially analyzed due to the low cost and by far more popular application of articulated robots, far fewer possibilities, and further disturbing contradictions exist between the geometrical requirements on the relatively large working radii, on the one hand, and the need for a high working speed and high loading capacity, on the other.

An example embodiment of the invention will now be detailed in two variants to illustrate and further explain the invention. Individual features as disclosed thereby are thus understood to be merely by way of example and not in any way a necessity. They may be further essential to the invention also in other combinations or each on its own.

BRIEF DESCRIPTION OF THE DRAWINGS

Reference is made to the drawings in which.

DETAILED DESCRIPTION

Figure 1:
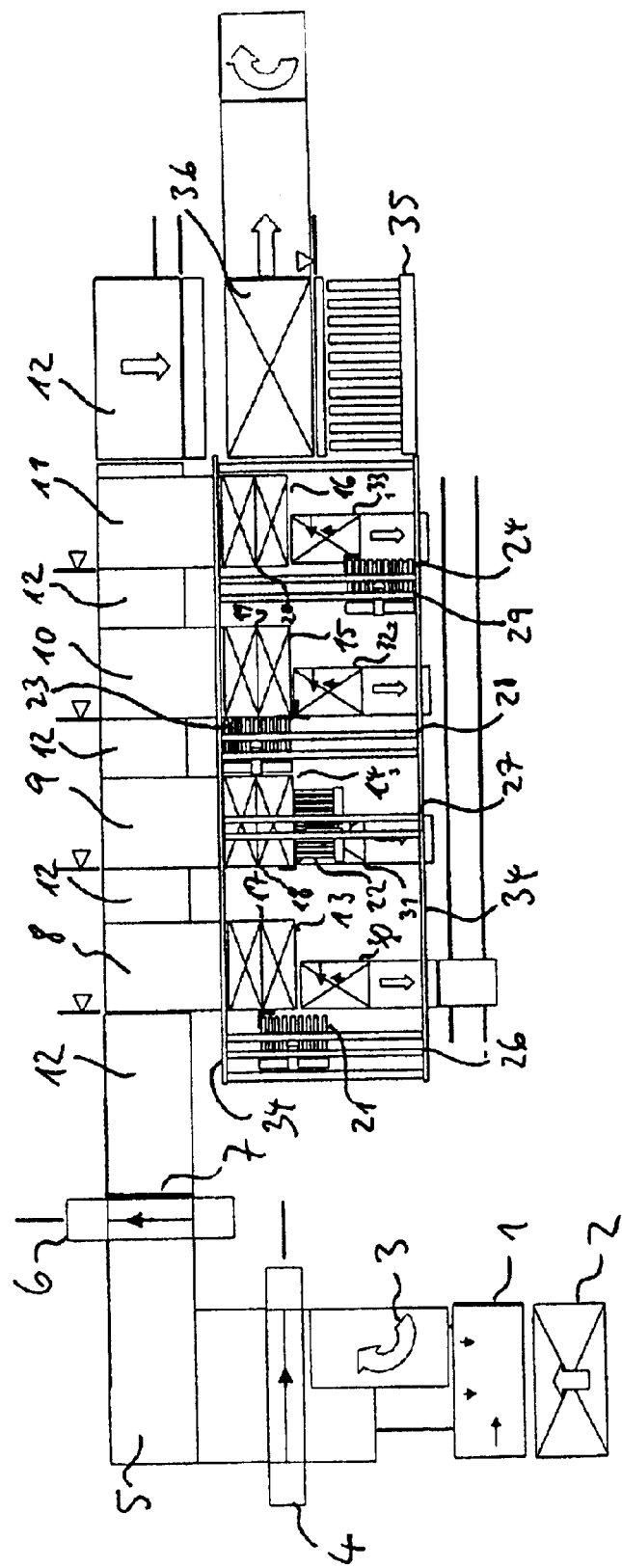
FIG. 1 is a plan view of a device in accordance with the invention as a first example embodiment.

Referring now to FIG. 1 there is illustrated a station 1 (not shown in more detail) furnished with master board sizes 2 in books of typically a few single boards. In the station 1 the large sizes 2 are located at fixed reference edges, corresponding to the arrows, to be available for further processing in a geometrically defined location.

As indicated by the arrow 3 the large sizes 2 may be rotated through 90° without this being a mandatory requirement, however. In any case cuts are made transversely through the large sizes 2 in a cutting saw 4 (circular book saw). In this arrangement and after rotation as indicated by the arrow 3 the cutting saw 4 may undertake a so-called head cut in which typically smaller cut pieces are located which are then produced by a second saw 6 to be detailed further on. Otherwise the cutting saw 4—where necessary after the head cut and reverse 90° rotation— implements the cuts in a direction corresponding to the longitudinal direction of the large sizes 2.

The books of boards cut lengthwise in this shape and where necessary also the books produced by the head cut, are fed by conventional ways and means via an angular transfer station 5 to a second cutting saw 6 of a type corresponding substantially to that of the first cutting saw 4. This second cutting saw 6 cuts the head cuts as remaining in the orientation produced by the rotation in accordance with the arrow 3 into individual cut-to-sizes pieces of smaller dimensions and cuts otherwise the panel books longitudinally in a second cycle in the direction corresponding to the transverse direction of the original large sizes 2. In this arrangement the "longitudinal strips" generated by the longitudinal cut of the saw 4 can be transported by pushers (not shown) against each other longitudinally when the cutting pattern provides for no full-length cross-cut lines (checker board type cutting patterns) at corresponding locations.

Both cutting saws 4 and 6 each work with a reference line. For the first cutting saw 4 this is the right-hand line in the transport direction as indicated by the bold line at the station 1. For the second cutting saw 6 this is the left-hand line in the transport direction, likewise as indicated by the bold line.

The reference line 7 evident at the output of the second cutting saw 6 corresponds to a separation in the direction corresponding to the horizontal in FIG. 1 representing the X-direction. This means that the cut-to-size pieces to be separated in the X-direction after cutting by the second cutting saw 6 are run by their abutment edge to the reference line 7, upon which the upstream part is halted and the downstream part conveyed further. Concretely, the reference line corresponds to the sawing line of saw 6.

The transport conveyor 12 located downstream of the reference line 7 in the X-direction consists of a conventional roller conveyor including a total of four angular transfer stations 8–11. Each of the angular transfer stations 8–11 has a reference line each located at its start and symbolized by the triangulated items already corresponding to the reference position in the X-direction for later stacking.

In FIG. 1 the Y-direction corresponds to the vertical. Y-movement in the angular transfer stations 8–11 is achieved by a lowerable belt conveyor realized between the rollers of the roller transport conveyor 12. In this arrangement the belt of the upper run comprises cams facing upwards (in the Z-direction in the sense of the present description) making up only part of the overall length of the belts roughly corresponding to the width of the transport conveyor 12. The belted transport conveyors extend, however, from the left-hand edge of the transport conveyor 12 in the Y-direction up to a reference line 17–20 of each picking station 13–16. Due to individual control of each belt or groups thereof within each of the angular transfer stations

8–11, the belt conveyors are able to selectively lift part of the cut-to-size pieces located in the region of the angular transfer stations 8–11 with the aid of the cams and transport them away in the Y-direction (vertical downwards as shown in FIG. 1). This is regularly the part adjoining each reference edge, whilst parts of the cut-to-size pieces located downstream in the X-direction remain as they are, where necessary, for further conveyance. In this way, the angular transfer stations 8–11 are able to select single groups from the cut-to-size pieces furnished by the transport conveyor 12 and separated already in the X-direction at the reference line 7. These groups are separated in the Y-direction at the reference lines 17–20, correspondingly. For this purpose each of the belted transport conveyors is split at these reference lines for separate control.

Figure 3:
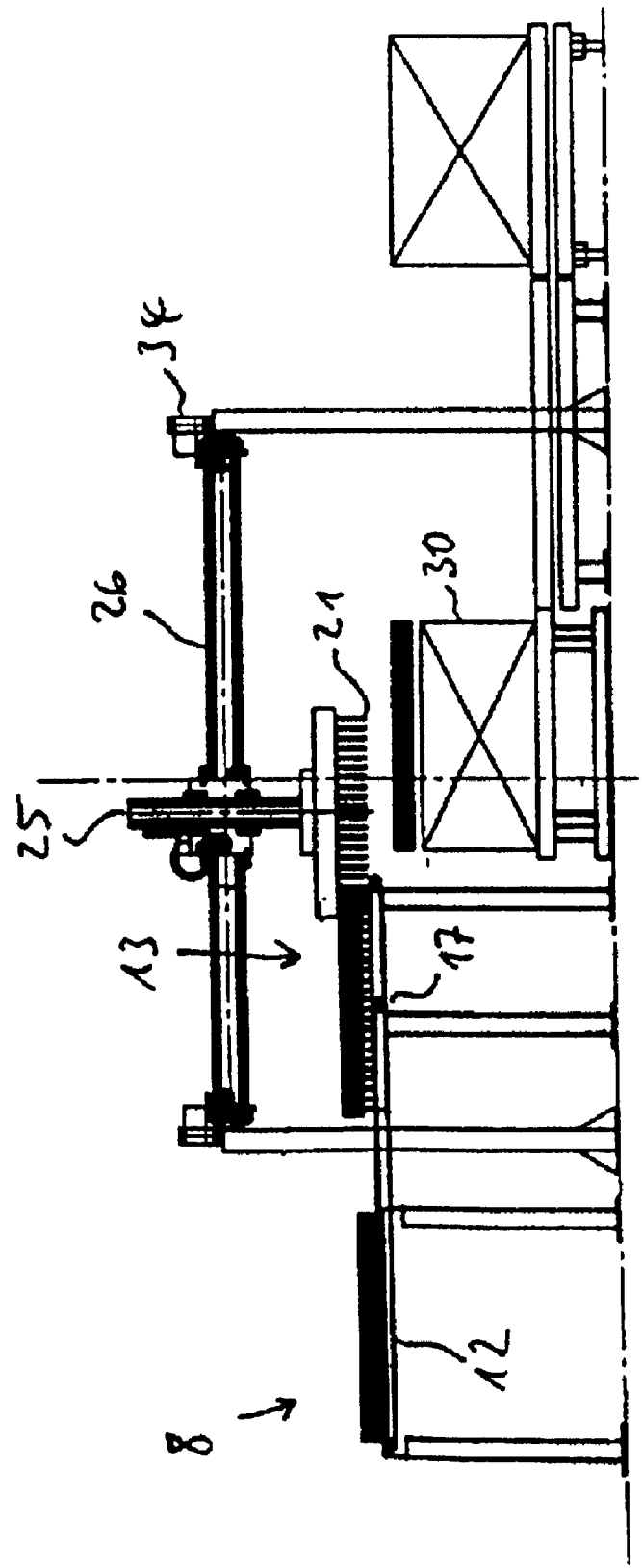
FIG. 3 is a section view taken along an X-direction for a better explanation of the devices as shown in FIGS. 1 and 2.

Referring now to FIG. 3 there is illustrated a cross-section as viewed in the X-direction showing the transport conveyor 12 on the left in the region of one of the angular transfer stations 8–11, to the right of which the belted transport conveyor is evident up to the reference line 17 and the actual picking stations 13.

The books of the cut-to-size pieces are thus available at the actual picking stations 13–16 separated in the X-direction and in the Y-direction and positioned at the reference line of the angular transfer stations 8–11; they further being positioned in the Y-direction at the downstream edge of the picking station 13–16.

The books of the cut-to-size pieces can now be picked by a fork-type picker 21–24. For this purpose the picking station 13–16 comprises pins (as indicated in FIG. 3) for lowering between the belts with which the books of cut-to-size pieces are lifted above the belts. These pins have in both the X-direction and Y-direction matching interspaces for accommodating the individual "prongs" of the fork 21.

The fork type picker 21–24 is suspended on a translational axis of the robot for traveling in the Z-direction (i.e. vertical or perpendicular to the paper plane in FIG. 1) by which it can be lifted and lowered, as indicated by 25 in FIG. 3. This robotic Z-axis 25 is suspended rotatable about the Z-axis on a Y-cross member 26–29 for traveling along the translational axis in the Y-direction as formed thereby in thus enabling the fork type picker 21–24 to be traveled between the picking stations 13–16 and the stacking bin 30–33 as described in the following.

Each Y-cross member 26–29 can be traveled in turn in the X-direction along a gantry frame 34 which thus forms a full-length translational axis in the X-direction.

In all, this example thus involves one to four robotic manipulators, depending on the degree of sophistication, each comprising a fork type picker 21–24, third translational and rotational Z-axes 25 (the remaining three not being identified) second Y-axes 26–29 and a common first X-axis 34. In other words, this thus involves in all one to four gantry robots having a unitized X-axis with, as aforementioned, each fork picker 21–24 being rotatable about each Z-axis in thus comprising a further rotational axis achieved together with the third translational axis.

The fork type pickers 21–24 present the cut-to-size pieces positioned as described at the picking stations 13–16 to the stacking bins 30–33 as evident in FIG. 1 and in FIG. 3. For a better illustration in FIG. 3 the books of cut-to-size pieces as indicated not only at the stacking bin 30 but also at the picking station 13 as well as upstream of the station 17 and at the transport conveyor 12 are shown shaded in each case.

The stacking bins 30–33 are configured so that the stacking plane (in the Z-direction) in each case is located below the Z-level of the picking station 13–16 so that each fork type picker 21–24 is able to rotate above each stacking bin 30–33 in thus enabling the fork type picker 21–24 to pick the cut-to-size pieces from the picking station 13–16 on two sides.

Placement at each stacking bin 30–33 is positioned in each case at the upper left-hand corner as shown in FIG. 1, once the first part of a new stacking layer, i.e. a new stacking pattern, is deposited in each case. The initial reference lines are thus the reference lines of the corresponding angular stations 8–11, on the one hand, and the upstream line of each stacking bin 30–33, on the other. The further parts of a stack pattern are deposited correspondingly at the parts already in place and rotated previously, where necessary.

Once a stacking pattern is finished, a lifting platform of each stacking bin 30–33 is lowered correspondingly in the Z-direction to in turn make a sufficiently low located upper face available for the next stacking layer. When the stack is fully completed it is transported in the Y-direction by ways and means as indicated by the arrows (in FIG. 1 below the stacking bin) to a rail-mounted transport means for removing the finished stacks by ways and means known as such.

No details of the design of the fork type picker 21–24 are illustrated, but in fact stops are provided alongside the indicated fork prongs and oriented transversely thereto, each of which can be shifted in the direction of the prongs. The stop thereof located at the prong end is hinged, so that it can be hinged out of the way on insertion of the prongs between the aforementioned pins in picking cut-to-size pieces. By means of the two stops the picked cut-to-size pieces can be clamped in place to permit fast movement of the robotic manipulators without the cut-to-size pieces slipping or dropping out of place.

On placement, the hinged stop is hinged up and the cut-to-size pieces are swept from the fork type prongs with the aid of the other stop. In this arrangement the fork type prongs are tapered pointed at their ends (in the Z-direction) and also configured tiltable somewhat about an axis oriented horizontal and perpendicular to the prong direction (in other words a further rotational robotic axis) to facilitate sweeping the cut-to-size pieces from the fork type prongs.

After lowering of each stacking bin 30–33 as aforementioned, the completed stacking patterns on the stacks are then once again centered by being aligned on all sides to compensate any gaps having materialized between parts of the stacking patterns on placement.

Some of the cut-to-size pieces may be transported over the full-length of the transport conveyor 12, i.e. beyond all four angular transfer stations 8–11 to a last section in the transport conveyor which is served by a conventional and, as compared to the described picker forks 21–24, large fork type carriage 35. This fork type carriage is able, by inserting its fork prongs between the rollers of the transport conveyor 12, to pick cut-to-size pieces and deposit them on a stacking bin 36. This stacking is, as such, totally conventional and intended only for cut-to-size pieces which singly (in the horizontal sense, i.e. as a vertical book throughout) are already intended to make up a stack pattern. No stacking patterns are thus assembled at the stacking bin 36. The resulting stacks are discharged in the X-direction by ways and means as indicated by the arrows and then rotated for reasons, which are of no concern to the present discussion. In this arrangement the stacks are aligned to each downstream edge of the stacking bin 36 in the X-direction and also in the Y-direction.

In all, the device in accordance with the invention as shown in FIG. 1 thus comprises five stacking bins, four of which are served by robotic manipulators in accordance with the invention whilst the fifth stacking bin is conventional for lack of necessity in collating the stacking patterns.

Although the device as shown in FIG. 1 is equipped with four robotic manipulators, it could in principle be served by one, two or three robotic manipulators. These would then have to apportion the stacking bins 30–33 to be supplied by corresponding ways and means by traveling along the X-axis of the gantry frame 34. More particularly, a device initially being equipped with just one or a small number of robotic manipulators may be subsequently extended at the already existing common gantry structure 34. In other words the device has a modular configuration.

It is further evident that the basic principle of the device can be extended practically to any degree in the directions of the translational axes, more particularly in the X-direction. This has not only the advantage of further stacking bins being subsequently added (whereby in the present case as shown in FIG. 1 the conventional stacking bin 36 with the corresponding components of the device would need to be shifted) but also the advantage of being able to make use of the same basic components and design principles for devices designed for different capacities. In other words, the devices can be customized from a modular concept system approach.

Figure 2:
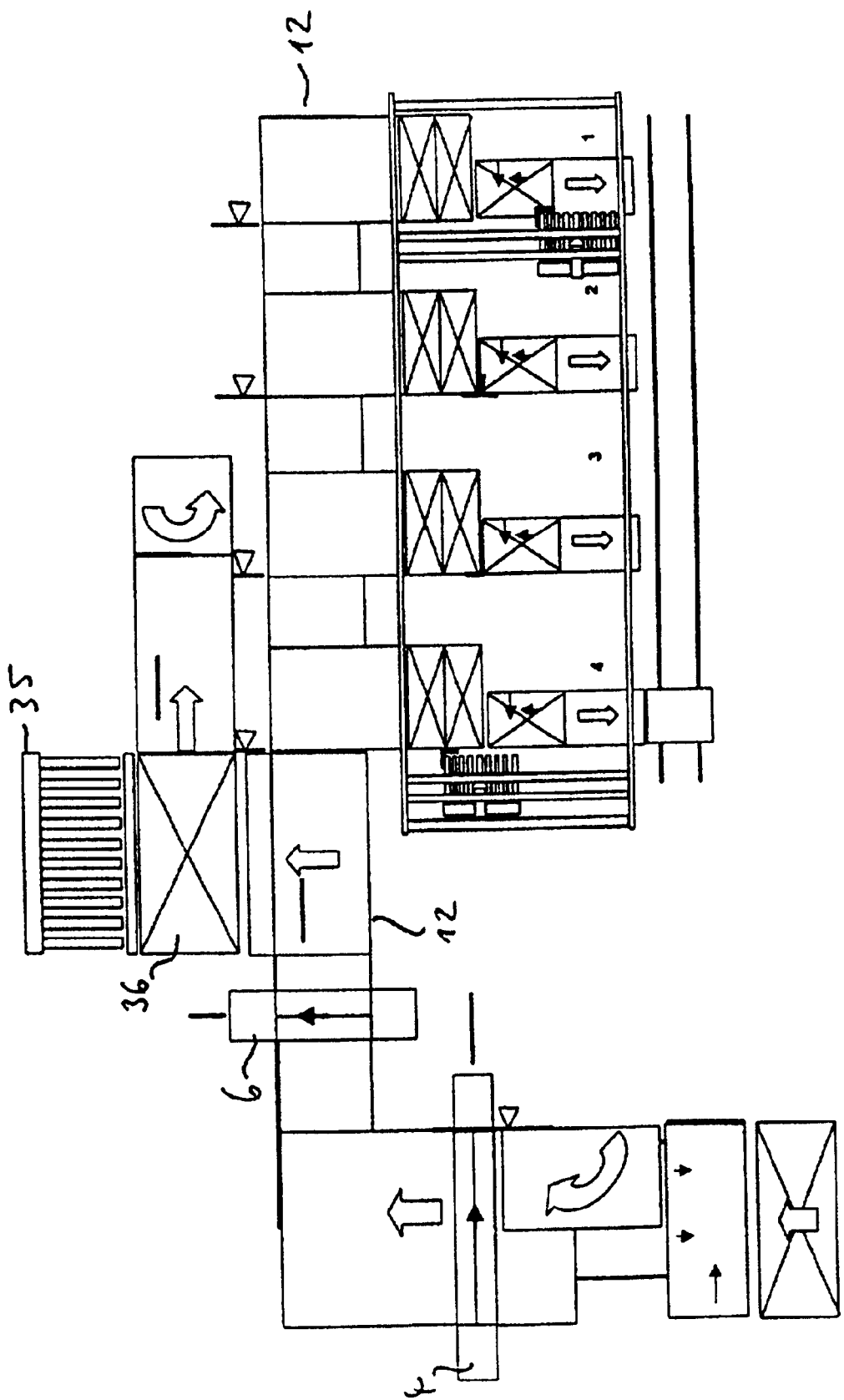
FIG. 2 is a further plan view of a device in accordance with the invention in a variant as shown in FIG. 1 but as a second example embodiment.

Referring now to FIG. 2 there is illustrated a variant of that as shown in FIG. 1, which differs in two ways. For one thing, only two robotic manipulators are shown for illustration. For another, the stacking bin 36 already described as such is, in this case, not arranged at the end but in the Y-direction alongside the start of the transport conveyor 12. This system is thus shorter in the X-direction and somewhat wider in the Y-direction than that as shown in FIG. 1 which may be of advantage, depending on the building space available. In addition, the cut-to-size pieces to be stacked at the stacking bin 36 do not need to travel the full-length of the transport conveyor 12 in this case.

Both variants have advantages specific to their application whilst being no different, however, in their basic method of operation.

To make for an uncluttered representation in FIG. 2 only a few reference numerals are indicated, although the details are identical to those of FIG. 1.

What is claimed is:

1. A device for stacking cut-to-size board pieces at a stacking bin into a stack, said device including a stacking bin, a robotic manipulator comprising first, second, and third translational axes and designed to pick said cut pieces, feed them to said stacking bin and to place them on said stacking bin in such a way that in placing said cut pieces a stacking pattern of said stack is assembled, a plurality of picking stations and a transport conveyor including a plurality of angular transfer stations designed for transporting cut pieces to each of said picking stations along a X-direction, said picking stations being assigned to one stacking bin each, arranged juxtaposed in said X-direction and each assigned to an angular transfer station of said transport conveyor for diverting said cut pieces into a Y-direction perpendicular to said X-direction, wherein said first translational axis of said robotic manipulator is oriented along said X-direction and said robotic manipulator can be shifted along said first axis to attain each of said picking stations and each of said stacking bins, said second translational axis of said robotic manipulator is oriented along said Y-direction and said robotic manipulator can be shifted along said second axis to move from a picking station to each assigned stacking bin and vice-versa, and said third translational axis of said robotic manipulator oriented perpendicular to said X-direction and to said Y-direction for movement of said robotic manipulator along said third axis for picking cut pieces from a picking station and placing cut pieces at a stacking bin, said transport conveyor is designed for transporting cut pieces from a cutting device for cutting said pieces to said picking stations, and for separation of groups of cut pieces at said angular transfer stations in said X-direction between said cutting and diverting and for separation in said Y-direction between said diverting and picking.

2. The device as set forth in claim 1 wherein a further stacking bin is provided at which cut pieces can be stacked but no stacking patterns can be assembled, said stacking pattern in this case consisting of a single one of said cut pieces.

3. The device as set forth in claim 2 wherein a further robotic manipulator is added to at least one already existing robotic manipulator of said device in such a way that said two robotic manipulators can be traveled along a common translational axis in said X-direction.

* * * * *